United States Patent [19]
Bogart

[11] 3,949,202
[45] Apr. 6, 1976

[54] IRREVERSIBLE DIGITAL COUNTER AND ODOMETER

[76] Inventor: Peter D. Bogart, 2338 Bronson Hill Drive, Hollywood, Calif. 90068

[22] Filed: Apr. 28, 1975

[21] Appl. No.: 572,344

Related U.S. Application Data

[62] Division of Ser. No. 362,751, May 22, 1973, Pat. No. 3,880,351.

[52] U.S. Cl. .............................. 235/95 R; 235/96
[51] Int. Cl.² .......................................... G01C 22/00
[58] Field of Search ....................... 235/95 R, 96, 97

[56] References Cited
UNITED STATES PATENTS

| | | | |
|---|---|---|---|
| 2,589,623 | 3/1952 | Merritt et al. | 235/95 R |
| 3,544,002 | 12/1970 | Summerer et al. | 235/96 |
| 3,580,497 | 5/1971 | Powell | 235/96 |
| 3,583,629 | 6/1971 | Heidel | 235/96 |
| 3,785,551 | 1/1974 | Regan | 235/96 |

*Primary Examiner*—Stephen J. Tomsky
*Attorney, Agent, or Firm*—Jack C. Munro

[57] ABSTRACT

The invention consists of an improved method of constructing and installing digital counting devices, such as odometers, digital time recorders and digital gauges, consisting of a self-destructing and tamper-proof "first" or left counting wheel. The numeral of the "first" counting wheel is obliterated by mechanical (or other) means after such numeral has passed the viewing window, thereby making it useless to attempt to "wheel back" the counter to indicate lesser usage, and thereby promoting safety and honesty to and by user, seller and buyer of the machines or devices to which the digital counter is attached. Such improved counters are practically irreversible. The invention accomplishes such goals by abrading, crushing, painting over, expunging, cutting off, slicing through, chiseling off the numeral after it has passed the viewing window, or burning such numerals off by passing them through electrodes which close a circuit when the numeral is moved forward, immediately thereafter interrupting the flow of current, or, in the alternative, being obliterated by magnetic means.

3 Claims, 9 Drawing Figures

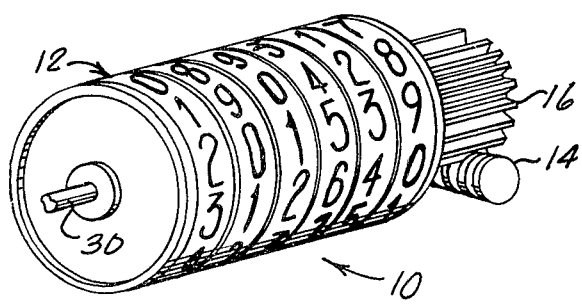
FIG. 1
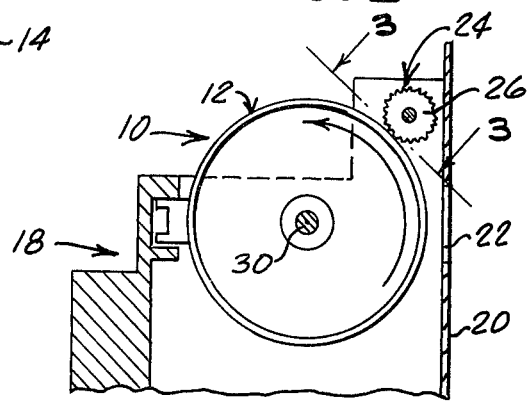
FIG. 2
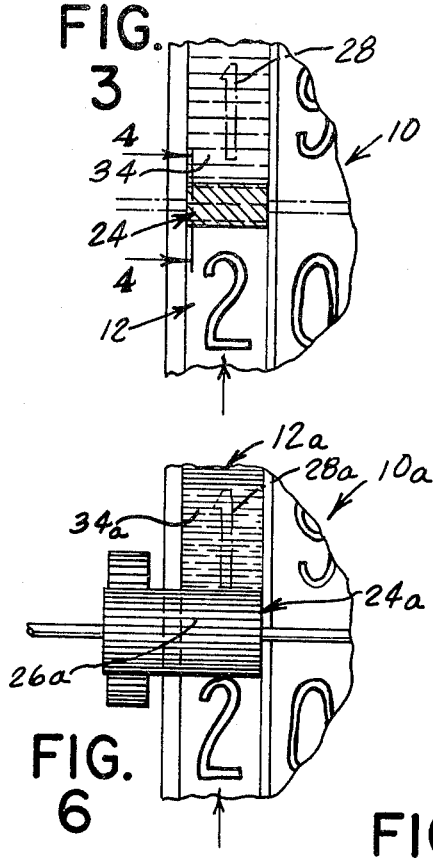
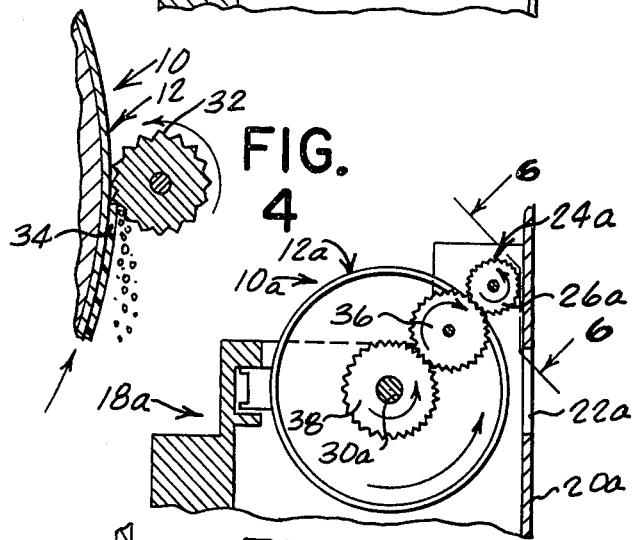
FIG. 5
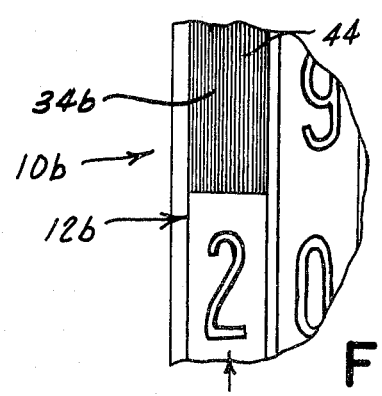
FIG. 9
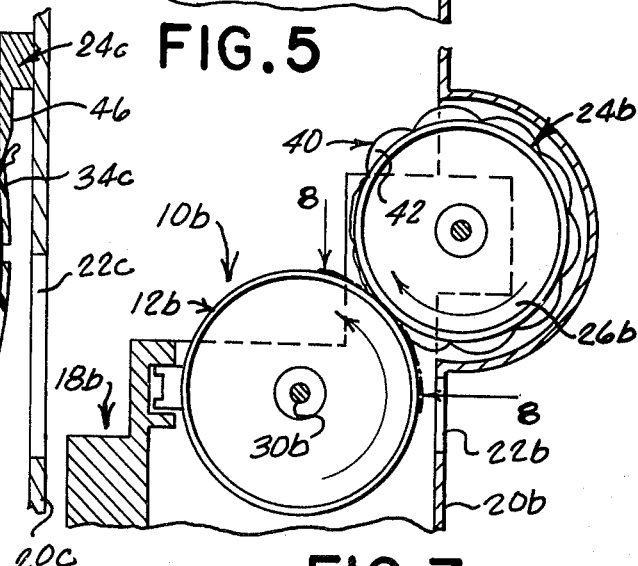
FIG. 7
FIG. 8

IRREVERSIBLE DIGITAL COUNTER AND ODOMETER

REFERENCE TO PATENT APPLICATION

This application is a division of patent application, Ser. No. 362,751 filed May 22, 1973 now U.S. Pat. No. 3,880,351.

SUMMARY OF THE INVENTION

The objects of the invention are to prevent spurious, fraudulent and misleading changes in digital counting devices, and thereby promote safety and knowledge of the true status, age and past use of machinery and equipment to which the digital counter is attached, or which it is part of. Thus, in common digital counting devices known as "odometers", it is the unfortunate practice of turning back the odometer so as to misrepresent past usage of the vehicle, aircraft, etc., thereby not only deceiving the buyer or user, but also endangering life and property through use of improper maintenance schedules, or use of outdated and overage equipment.

The invention adopts a comprehensive improved method to render digital counters practically irreversible at a point where reversibility is becoming dangerous. This is accomplished by a self-destruct mechanism, which obliterates the numeral on the first (or top-digit) wheel after it has passed the viewing window. Further security is provided by engraving onto or etching into the wheels of the digital counter permanently the identifying numbers or letters of the equipment (motor etc.) to which the digital counter is annexed, so as to alert every person to any changes or alterations.

A further object of the invention is to provide an inexpensive yet virtually invulnerable and tamperproof digital counting device (for brevity's sake the term "odometer" will be used hereinbelow as an example for all digital counters). Thus, a standard odometer consists generally of five or six independent wheels, operated by the motion of the speedometer shaft (or propeller shaft), which record elapsed distance. The units are from 1/10ths to 10,000s. A small driving catch generally rotates the next wheel (to the left) one place or digit for each complete revolution of the preceding disc. Thus, by way of illustration, a six-digit odometer would — under the improved method — turn up to 99,999.9 units — miles, knots, kilometers etc. — at which point there would appear in the viewing window an obliterated space on the first wheel, indicating excessive usage, and making any wheeling back of the odometer useless. Even prior to the end of the first wheel, it would be virtually useless to wheel back the odometer, since the most anyone could gain would be, in the foregoing example, some 9,000 units, which is a generally acceptable margin on motor vehicles.

A still further object is to relieve law enforcement personnel from policing the odometer readings of motor vehicles or other instruments, machinery and equipment.

Other objects and purposes and methods of accomplishing them will appear from the specification and drawings, in which:

FIG. 1 is a somewhat enlarged, three-dimensional, oblique view of an odometer with associated housing and certain parts removed for reasons of drawing simplification and clarity.

FIG. 2 is a view in left-end elevation of the representative odometer of FIG. 1 shown in mounted relationship with respect to a fragmentarily and sectionally shown motor-vehicle odometer housing, and with one representative embodiment of the present invention associated with the odometer for preventing the reversing of the left odometer wheel, which indicates the highest numerical power.

FIG. 3 is a somewhat enlarged, fragmentary view partly in elevation and partly in section taken substantially along the plane and in the direction indicated by arrows 3—3 of FIG. 2, and shows an obliterated numeral carried by the left odometer wheel after it has passed the viewing window.

FIG. 4 is a fragmentary side view, partly in elevation, and partly in section, taken substantially along the plane and in the direction indicated by the arrows 4—4 of FIG. 3; it clearly illustrates the number-obliterating or number-erasing means of the representative first alternative of the invention in action.

FIG. 5 is a view of aspect similar to FIG. 2, illustrating a slightly modified form of the invention, wherein the number-obliterating device is an abrasive or grinding means for effectively abrading or grinding away an odometer numerical, after it has passed the viewing window, rather than a crushing means as shown in the first alternative.

FIG. 6 is a better, somewhat enlarged, staggered plane view taken substantially along the staggered plane and in the direction indicated by the arrows 6—6 of FIG. 5, showing the grinding-wheel type of number-obliterating or number erasing means in action.

FIG. 7 is a view generally similar to FIGS. 2 and 5, illustrating a further representative modification of the number-obliterating means, comprising multiple, circumferentially arranged, sealed, marking-agent compartments arranged to be effectively opened and applied in an inking or painting manner to an odometer numeral, only at the instant that it has passed the viewing window, thereby obliterating same.

FIG. 8 is a fragmentary, somewaht enlarged view taken generally as indicated by arrows 8—8 of FIG. 7, showing the inked-over or painted-over numeral of the left odometer wheel, after it has passed the viewing window and has been effectively obliterated.

FIG. 9 is a fragmentary aspect similar to FIG. 4, showing a further alternative, whereby the number-obliterating means removes an exterior numeral panel from the underlying wheel after it has passed the window.

Description of the Invention

The invention is an improvement of existing digital counters, with an improved feature of "self-destructing" first (or left) wheel, which makes a reversal or "wheeling back" of such counter completely useless and hence non-feasible.

With reference to FIG. 1, a typical digital counter is illustrated, sometimes known as "odometer", with the housing and certain parts removed. The odometer is typically driven through a small worm gear, mounted on the speedometer shaft of a vehicle. The motion of the speedometer shaft, greatly reduced by another gear unit, is transmitted to the odometer. Since a certain number of revolutions of the shaft corresponds to a certain distance travelled by the wheels of the car, the odometer gives direct reading of the distance covered, e.g. miles, knots, kilometers, etc. The odometer 10 includes all the odometer wheels, (generally five or six independent wheels bearing equidistant numerals from 0 to 9 on the outer surface of each wheel). When the right wheel, which counts customarily 1/10th units, has performed a complete revolution, typically a small driving catch rotates the second wheel from the right one place. The process is continued until the left (or "first") wheel 12 which in the illustration indicates 10,000 units is advanced one place upon completion of a complete turn by the second wheel from the right.

The first version of the invention is illustrated by FIGS. 1–4. The worm 14 is driven by the conventional odometer cable (not illustrated), which drives a worm wheel 16 mounted on a shaft 30 which drives directly the six odometer wheels of the complete odometer 10, each effectively at a rate one-tenth of the preceding odometer wheel, as one proceeds from the right end to the left end of the complete odometer and wheel 12.

FIG. 2 shows a left end elevation of odometer 10 shown with a fragmentarily and sectionally shown housing 18, generally mounted on a dashboard. The wall of the odometer housing 20 which faces the person driving the vehicle, is penetrated by a transparent viewing window 22. Reference numeral 24 generally designates a presentative first type of type of obliterating means for obliterating the numeral 28 of the left odometer wheel 12 which is shown in the specific example in FIG. 2 as consisting of a crushing wheel 26. Said crushing wheel 26 is in engagement with the exterior of the left odometer wheel 12 at a location just past the viewing window 22 and operates by effectively crushing, cracking and flaking away of the brittle numerals 28 of the left odometer wheel 12. The crushing wheel 26 is located so the periphery of wheel 26 is in tight contact with the exterior of odometer 12, the contact being so tight that the teeth 32 of the wheel 26 "cut into" the exterior of odometer wheel 12. The crushing wheel 26 is rotatably driven along with the rotation of the left odometer wheel 12 by the inherent frictional engagement therebetween.

The number-obliterating process according to the first version of the invention is best illustrated in FIG. 4. The crushing teeth 32 of the crushing wheel 26, which crush, crack and break away the outer layer 34 (or the alternative, raised numerals comprising such outer layer) of the left odometer wheel 12. FIG. 3 presents a part-elevation view of the improved process shown in FIG. 4, showing the obliterated numeral 28 after it has passed under the crushing wheel 24, which passing was caused by a complete revolution of the preceding wheel of odometer 10, as described hereinabove.

The first modification illustrated in FIGS. 5 and 6 employs the same reference numerals, followed by the letter a for similar parts and employs new reference numerals for new parts.

FIG. 5 is a view similar to FIG. 2. The left end elevation of odometer 10a inside a fragmentarily and sectionally shown housing 18a; the wall of the odometer housing 20a is penetrated by a transparent viewing window 22a. All wheels of odometer 10a are mounted on a common shaft or spindle 30a, upon which is affixed a coupling gear 38, which drives the second coupling gear 36, which, in turn, drives a grinding or abrading wheel 26a, that grinds away or abrades the numeral 28a from the left wheel 12a of odometer 10a. FIG. 6 is a different, staggered plane view of the process shown in FIG. 5, where the grinding wheel 26a has ground off and/or abraded numeral 28a carried on the left wheel 12a of the odometer 10a, which left wheels exterior surface 34a has rotated opposite the the rotating grinding wheel 26a after passing the viewing window 22a. Reference numeral 24a generally designates the modified left-odometer-wheel-number (28a) obliterating or erasing means which includes the grinding wheel 26a and two coupling gears 36 and 38.

The second modification shown in FIGS. 7 and 8 employs the same reference numerals, followed by the letter b, for similar parts and employs new reference numerals for new parts as follows:

FIG. 7 is a view generally similar to FIGS. 2 and 5, illustrating a further representative modification of the number obliterating means, comprising multiple, circumferentially arranged, sealed (40) compartments or cells containing a marking agent 42, mounted along the outer circumference of a rotating wheel 26b, which contains an outer layer of the obliterating agent 24b. The latter is positioned for crushing the plural, externally sealed, individual, circularly arranged compartments 40, one by one; said compartments 40 each have a breakable outer exterior covering, and inside a drop of ink or paint, or an inked sponge or the like 42. Each compartment is crushed or sliced open on contact with the numeral of the left wheel 12b of odometer 10b, after the complete revolution of the next-to-the last odometer wheel has turned the left wheel 12b one digit past the viewing window 22b mounted on the wall of odometer housing 20b which faces the driver or observer. FIG. 7 is a representative left end elevation of the second modification, shown in mounted relationship with a sectionally shown odometer housing 18b. FIG. 8 shows the inked-over and obliterated numeral 34b of the left odometer wheel 12b, completely inked over as specifically shown by reference numeral 44.

A third modification is illustrated by FIG. 9; all parts similar to previously described parts are designated by the same reference numerals, followed by the letter c. Reference numeral 24c generally designates the left-odometer-wheel (12c)-obliterating or erasing means, which in this third modification comprises a chisel 46, closely engaged under the end of an outer layer 34c which carries the left odometer wheel numbers, so as to strip away each left odometer number after it has passed the viewing window 22c, which is mounted on the instrument panel 20c. Numeral 10c generally illustrates the odometer in this sdie view designated as FIG. 9, which is a fragmentary side view, partly in elevation and partly in section.

Not illustrated are similar applications of the invention to other digital counter for time, distance, flow-through etc., all of which are called herein "odometer".

What is claimed is:

1. In combination with a digital counter consisting of two or more movable wheels mounted on a common shaft, rotation of said shaft to effect movement of said wheels with each said wheel being movable at a different ratio of movement with respect to the other of said wheels with there being a single said wheel movable at the slowest ratio, indicia located on the periphery of said slowest moving wheel, an inlined section of said wheels being obervable through a viewing window formed within a housing, said wheels being rotatably mounted with respect to said housing, the improvement comprising:

an obliteration means mounted adjacent said slowest moving wheel, said obliteration means to effect obliteration of said indicia upon said slowest moving wheel after said indicia is moved across said viewing window and no longer observable therethrough, wherein said obliteration means comprises;

a grinding wheel rotatably mounted upon said housing, said grinding wheel having a teethed periphery, said grinding wheel being rotatably driven by at least one coupling gear, said coupling gear being rotatably driven by said common shaft, said teethed periphery being in tight frictional contact with said slowest moving wheel, whereby as said slowest moving wheel is moved said teethed periphery obliterates the portion of said indicia which passes said viewing window.

2. The combination as defined in claim 1 wherein:
there being a plurality of coupling gears interconnecting said common shaft and said grinding wheel.

3. The combination as defined in claim 2 wherein:
the coupling gear directly connected to said common shaft being the largest in size of said coupling gears, the grinding wheel being smaller in size than said coupling gears.

* * * * *